United States Patent [19]

Smith

[11] Patent Number: 4,597,407
[45] Date of Patent: Jul. 1, 1986

[54] FUEL CONTROL SYSTEM FOR A GAS TURBINE ENGINE

[75] Inventor: Trevor S. Smith, Four Oaks, England

[73] Assignee: Lucas Industries public limited company, Birmingham, England

[21] Appl. No.: 540,559

[22] Filed: Oct. 11, 1983

[30] Foreign Application Priority Data

Oct. 28, 1982 [GB] United Kingdom ................ 8230796

[51] Int. Cl.⁴ ............................................ G05D 11/00
[52] U.S. Cl. .................................. 137/115; 137/492.5; 251/28
[58] Field of Search ................... 251/28; 137/115, 489, 137/490, 492.5

[56] References Cited

FOREIGN PATENT DOCUMENTS 2079983 1/1982 United Kingdom ................. 251/28

Primary Examiner—Samuel Scott
Assistant Examiner—Noah Kamen

[57] ABSTRACT

A fuel control for a gas turbine engine comprises a metering device and a pressure relief valve for spilling fuel from an upstream side of the metering device. The relief valve is also responsive to a servo pressure which is regulated by a valve which is operated when a speed of the engine rises above a predetermined level, so that in these circumstances an increased amount of fuel is spilled to reduce flow to the engine. A further valve is operable to vent the servo pressure completely, and to effect spill of substantially all of the fuel, when engine shut-down is required.

4 Claims, 4 Drawing Figures

FUEL CONTROL SYSTEM FOR A GAS TURBINE ENGINE

BACKGROUND OF THE INVENTION

This invention relates to a fuel control system for a gas turbine engine.

It is known, for example, from UK patent application 2,088,962A, to provide a gas turbine engine fuel control system which includes a flow limiting valve in series with a metering device. The flow limiting valve operates when selected engine conditions exceed predetermined levels, and may also be operated to shut off flow completely, in response to a signal which requires the engine to be stopped. It is also known, for example from the above patent application, to provide a pressure relief valve which is connected between the outlet and inlet of a positive displacement pump which supplies fuel to the engine.

SUMMARY OF THE INVENTION

It is an object of the present invention to provide a fuel control system in which the aforesaid series flow limiting valve is dispensed with and in which flow limitation is effected by a modified form of pressure relief valve. The modified pressure relief valve may also be maintained in a fully open condition to spill fuel sufficiently to reduce pressure within the system to a level at which flow to the engine ceases.

According to the invention, there is provided a fuel control system for a gas turbine engine, comprising a metering device, means for maintaining a substantially constant pressure difference across said metering device and a first valve, responsive to fuel pressure upstream of said metering device and to values of an engine speed in excess of a predetermined level, for spilling fuel from said upstream side of said metering device.

In a preferred embodiment, said first valve is responsive to a servo pressure, and there is provided a second valve responsive to said engine speed for regulating said servo pressure, and a third valve for setting said servo pressure to a level at which said first valve is fully open.

In a particular embodiment there is provided a fourth valve in series with said metering device, and means for biassing said fourth valve shut, said fourth valve being operable against said biassing means by the fuel pressure downstream of said metering device, and a fifth valve actuable by said fourth valve, said fifth valve being operable when said fourth valve is shut to maintain said servo pressure at the level at which said first valve is fully open.

BRIEF DESCRIPTION OF THE DRAWINGS

An embodiment of the invention will now be described by way of example only, and with reference to the accompanying drawings, in which.

DESCRIPTION OF THE PREFERRED EMBODIMENTS

Figure 1:
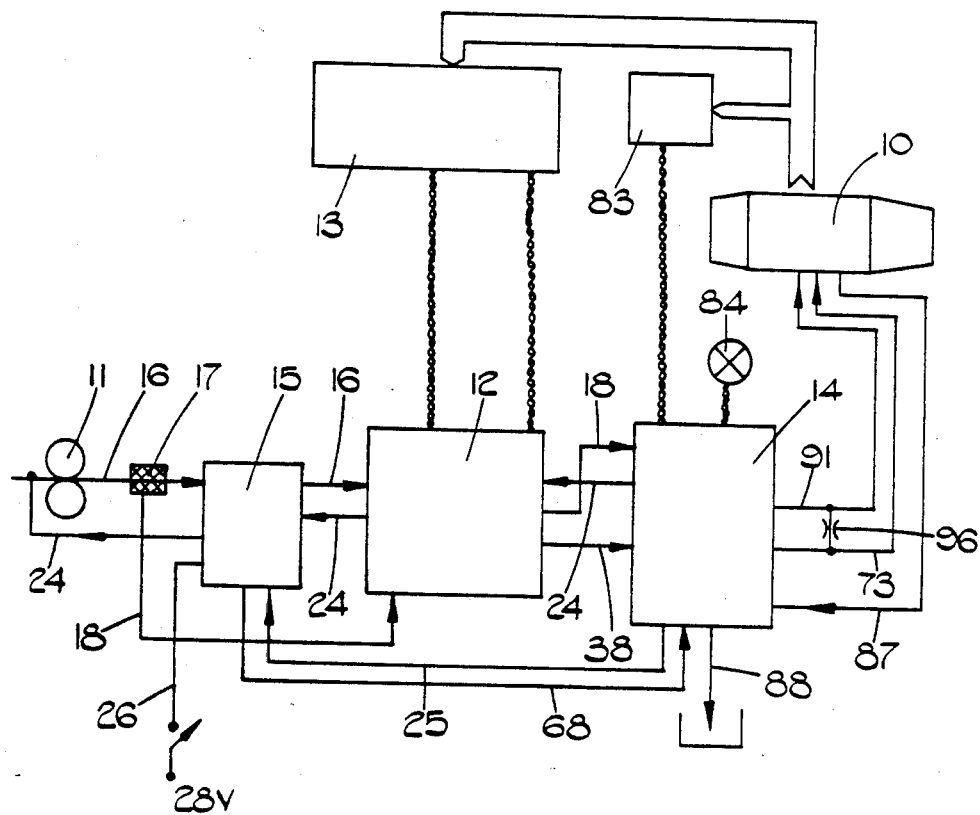
FIG. 1 is a block diagram of a fuel control 15 system for a gas turbine engine.

As shown in FIG. 1, a gas turbine engine 10 is supplied with fuel from a positive displacement pump 11, fuel flow being regulated by a variable metering device 12 which is under control of a high integrity digital computer 13 which is responsive to desired and sensed operating conditions of the engine 10. The metering device 12 is shown in more detail in FIG. 3, and fuel flow therefrom passes to the engine 10 by way of an arrangement 14 shown in more detail in FIG. 4. Fuel flow to the engine 10 may be limited by a combined pressure relief and spill valve arrangement 15 which is shown in more detail in FIG. 2, and to which fuel is delivered by the pump 11 through a line 16. A filter connection 17 to the line 16 provides high pressure filtered fuel to a delivery line 18.

Figure 2:
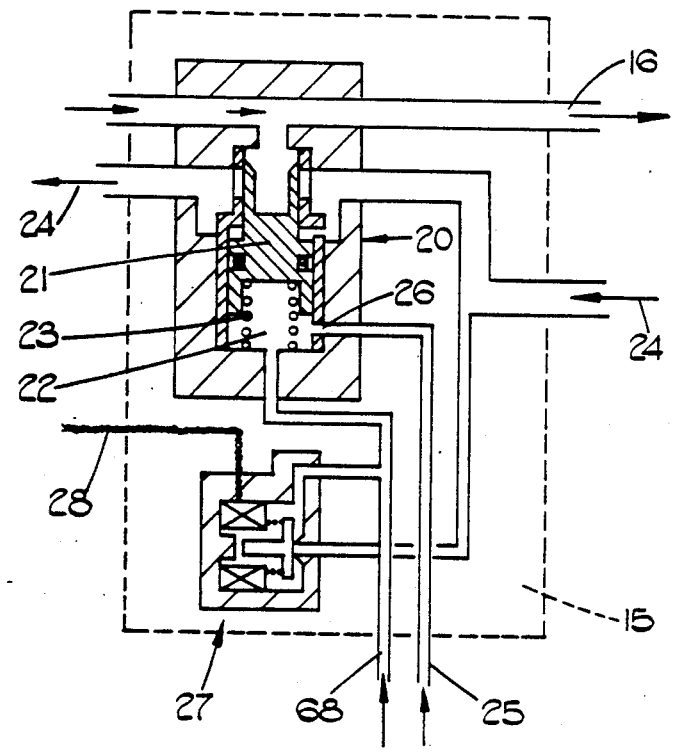
FIG. 2 is a diagram of a flow limiting spill valve arrangement, forming part of FIG. 1.

As shown in FIG. 2, the arrangement 15 includes a relief valve 20 having a control element 21 which has a lesser area responsive to the pressure in line 16 and a larger area responsive to a servo pressure in a chamber 22. The element 21 is also biased against the pressure in line 16 by a spring 23. The valve 20 is operable to spill fuel from the line 16 to a low pressure return line 24 which communicates with the upstream side of the pump 11. The pressure in chamber 22 is derived from that in line 18 in a manner to be described and is applied through a line 68. The pressure in chamber 22 can also be regulated through a line 25 and a port 26, the port being shut off by the control element 21 when the valve 20 is half open. Reduction of pressure in the line 16 in response to a reduction of the servo pressure in line 25 is thereby limited. The chamber 22 can be connected to the low pressure return line 24 by means of an electromagnetic valve 27 which is opened by an electrical signal on a line 28 in response to a requirement to shut down fuel flow to the engine 10. Energisation of the valve 27 allows the valve 20 to become fully open and substantially all of the fuel in line 16 to be spilled to the return line 24. The consequent reduction of pressure in line 16 is used, in a manner to be described, to maintain a low pressure in the chamber 22, and hence a low pressure in line 16, even after the valve 27 has subsequently been shut.

Figure 3:
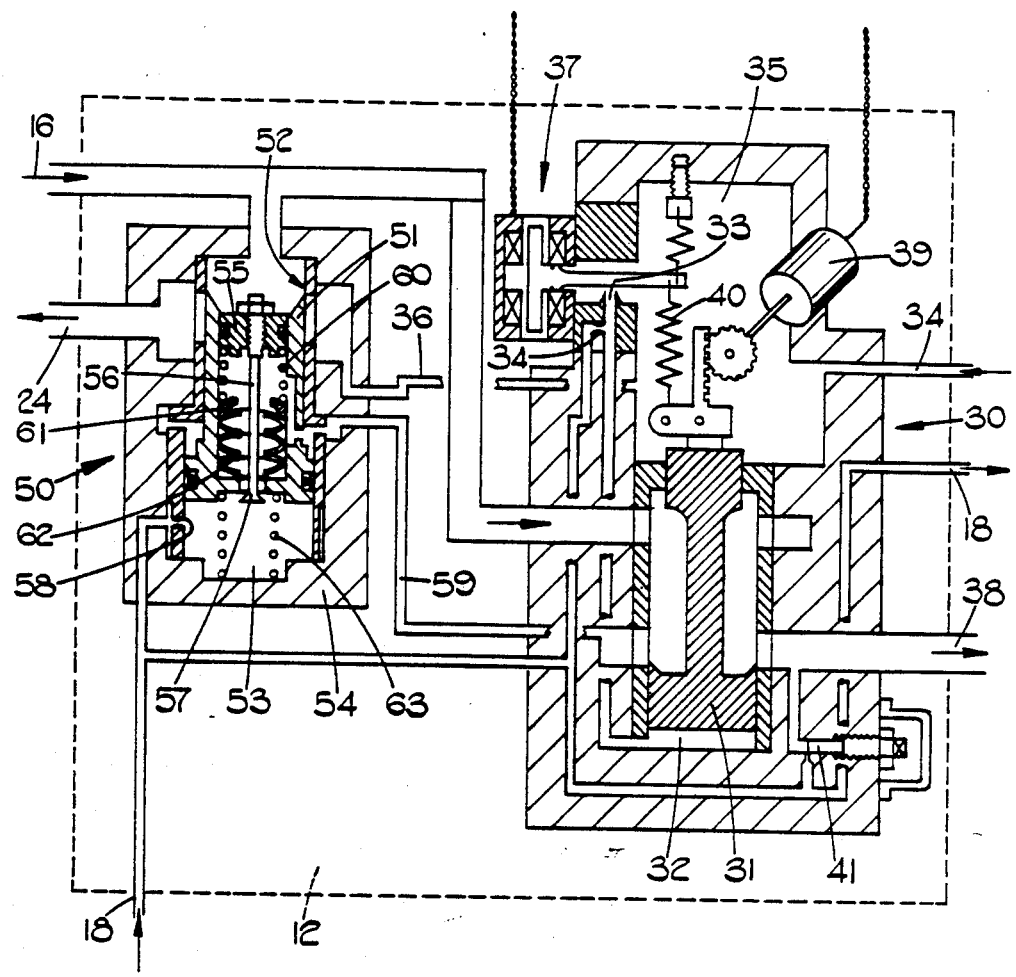
FIG. 3 is a diagram of a variable metering device forming part of FIG. 1.

The metering device 12 shown in FIG. 3 includes a metering valve 30 which receives fuel on the line 16 from the pump 11. The valve 30 includes a control element 31 which is responsive to the pressure in a chamber 32. A valve 33 and a flow restrictor 34 are arranged in series between a chamber 35 and the high pressure line 18. The chamber 35 communicates by way of a passage 36 with the low pressure return line 24. The pressure in chamber 32 is that intermediate the valve 33 and restrictor 34. The valve 33 is pivotally movable by a dual-coil torque motor 37, each separate coil of the motor 37 being effective to operate the valve 33. Current is supplied to respective coils of the motor 37 from drive circuits (not shown) associated with the digital computer 13. The control element 31 regulates fuel flow from the line 16 to a line 38 and the operating position of the element 31 is detected by a synchro-resolver 39 from which the computer 13 derives position signals. A feedback spring 40 coacts with the control element 31 and with the valve 33 so that movement of the element 31 alters the bias on the valve 33 in such a way as to vary the pressure in chamber 32 to oppose the aforesaid movement of the control element 31. An adjustable orifice 41 allows a small quantity of fuel to flow from the high pressure line 18 to the line 38, providing an additional fuel flow to the engine, this additional fuel flow having a maximum effect during engine starting, when metered fuel flow would otherwise be low.

The metering device 12 also includes a valve arrangement 50 for spilling fuel from the line 16 back to the low pressure return line 24. The spill valve 50 has a control element 51 which is slidable in a bore 52 to control flow between the lines 16, 24. The control element 51 is responsive to a servo pressure in a chamber 53 which is defined between a housing 54 and one end of the control element 51. A piston 55 is slidable within the control element 51 and includes a stem 56 which extends through the end of the control element 51 and defines, in conjunction with that end, a valve 57 for regulating servo pressure in the chamber 53. The valve 57 is in series with a flow restrictor 58 between the line 18 and a passage 59 which communicates with the line 38 downstream of the metering valve 30. The piston 55 is thus responsive to a difference between the pressures upstream and downstream of the metering valve 30 and is biassed against movement in response to this pressure difference by a spring 60 which is supported by means of a collar 61 on a stack 62 of bi-metal discs which are responsive to fuel temperature. The bias applied by the spring 60, for a given position of the piston 55, is thus adjusted in accordance with fuel temperature. A further spring 63 acts to shut the valve 50 on the absence of a pressure in the line 16.

An increase in the pressure difference across the metering valve 30 causes the piston 55 to move downwardly, opening the valve 57 and reducing the servo pressure in the chamber 53. The control element 51 then moves downwardly to increase spill flow until the aforesaid pressure difference returns to its original value.

Figure 4:
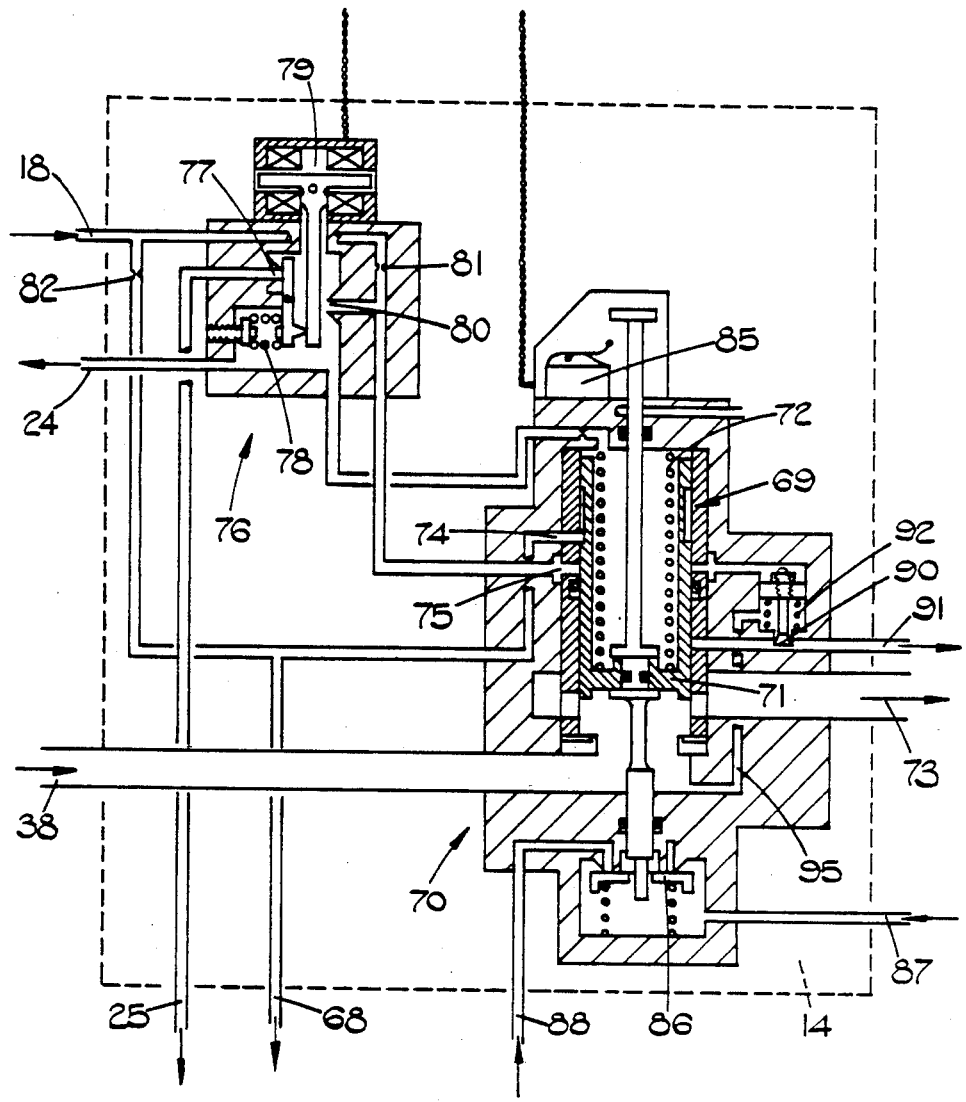
FIG. 4 is a diagram of a pressure raising and servo pressure control arrangement forming part of FIG. 1.

As shown in FIG. 4, the arrangement 14 includes a pressure raising valve 70 to which fuel can flow through the line 38 and has a control element 71 biassed by a spring 72 towards a shut position, the element 71 being movable against the spring 72 by the pressure in line 38, to allow fuel flow to the engine 10 through a delivery line 73. A function of the valve 70 is to prevent fuel flow to the engine 10 until the fuel pressure within the system has reached a predetermined level which is sufficient to provide the necessary operating servo pressures. The control element 71 includes an annular groove 69 which, when the valve 70 is shut, interconnects ports 74 and 75. The port 74 communicates through a line 68 with the servo pressure chamber 22 of the spill valve 20 (FIG. 2). The arrangement 14 also includes a servo pressure control device 76 which has a valve 77 which is biassed shut by an adjustable spring 78 and which can be moved against this spring by a torque motor 79 when the latter is rotated clockwise, as viewed in the drawing. The valve 77 is operable by the torque motor 79 to connect the chamber 22 (FIG. 2) to the low pressure return line 24, by way of the port 26 and line 25.

The device 76 includes a further valve 80 which is also controlled by torque motor 79, the valve 80 being open in the de-energised condition of the motor 79. The valve 80 connects the low pressure return line 24 to the port 75 of valve 70. The port 75 also communicates with the line 18 through flow restrictor 81. The line 68 communicates with the line 18 through a restrictor 82. With the valve 77 and port 75 shut the pump delivery pressure in line 18 is thus applied to the larger area of the control element 21 (FIG. 2) to urge the latter shut against the pressure in line 16.

The torque motor 79 is operated by signals from a computer 83 (FIG. 1) which is responsive to the speeds NL and NI of low and intermediate pressure shafts respectively of the engine 10. An apparatus for controlling a valve in response to overspeeding by either of two shafts of a gas turbine engine is described in UK patent application No. 8220913, and such an apparatus may be used to energise the torque motor 79 in the present invention. If either speed exceeds a predetermined level the computer 83 energises the torque motor 79 clockwise to open the valve 77 and thereby to reduce the servo pressure in chamber 22 by way of the line 25. The relief valve 20 thus opens to reduce fuel pressure in the line 16, and hence flow to the engine 10. The amount by which the valve 20 can open is limited by the position of the port 26, which shuts when the valve 20 is approximately half open. With the valve 77 open the control element 21 of the valve 20 adopts an equilibrium position in which flow through the restrictor 82, line 68, port 26, line 25 and valve 77 results in an intermediate pressure in chamber 22, this intermediate pressure acting on the larger area of the element 21 to balance the pump delivery pressure acting on the smaller area of that element. When the engine speed has fallen to an acceptable level the torque motor 79 allows the valve 77 to be shut by the spring 78, the servo pressure in line 25 rises towards that in line 18, and the valve 20 shuts.

The valve 77 is normally shut and, as described above, if the valve 27 (FIG. 2) is energised the servo pressure in chamber 22 falls to a low value and the valve 20 can become fully open to spill substantially all of the fuel from line 16. The resulting drop in system pressure allows the valve 70 (FIG. 4) to shut under the influence of the spring 72, thereby preventing fuel from reaching the engine 10 through the line 73. In this condition of the valve 70 the ports 74, 75 are interconnected by the groove 69 so that the servo pressure in the chamber 22 of the valve 20 is connected to the low pressure return line 24 through the line 68, the ports 74, 75 and the valve 80.

When the pressure raising valve 70 is shut an indicator device 84 (FIG. 1) is energised through a microswitch 85, and a plate valve 86 is opened to connect a drain line 87 from the engine fuel manifold to a dump connection 88. The microswitch 85 also causes the electromagnetic valve 27 to be de-energised, and therefore shut. Pressure in chamber 22 is nevertheless maintained low by the interconnection between the ports 74, 75 as aforesaid.

When the engine is to be started the torque motor 79 (FIG. 4) is energised anticlockwise, shutting the valve 80. The pressure raising valve 70 will at this stage be shut and the ports 74, 75 interconnected. Shutting the valve 80 effectively over-rides the valve provided by the ports 74, 75 and the pressure in line 68 can rise.

As the system pressure increases, the rising pressure in line 68 shuts the valve 20 and further raises the pressure in lines 16, 18. The pressure in line 18 is applied through restrictors 81, 82 and the port 75 to open a start valve 90 against a spring 92. Though the valve 70 is shut fuel can nevertheless pass from the line 38 through a passage 95 to a start supply line 91. When the system fuel pressure reaches a predetermined value the valve 70 opens, supplying fuel to the main burners of the engine 10 through the line 73.

After the engine 10 has been started the torque motor 79 is de-energised, opening the valve 80 and removing pressure from the start valve 90 which is then shut by its spring 92. The valve 90 is maintained shut by the pressure in line 38, applied through a line 95. An orifice 96 (FIG. 1) interconnects the lines 73 and 91 and permits fuel to flow continuously to the starter jets of the engine 10, through the line 91, and thereby prevents charred fuel residues from accumulating in the starter jets.

The fuel pressure in line 16 is applied to the valve 77 through the line 18, restrictor 82, line 68 and line 25. If this pressure exceeds a value which is set by the spring 78, and which is a predetermined multiple, for example 1.1, of normal system pressure in line 16, the valve 77 lifts and thereby prevents the pressure in the chamber 22 of valve 20 (FIG. 1) from rising in response to any further increase in the system pressure. Any such further increases will cause the valve 20 to open and spill fuel from the outlet of the pump. The valves 77 and 20 thereby co-operate to provide a system pressure relief device.

I claim:

1. A valve arrangement for a gas turbine engine fuel system, said valve arrangement including means for controlling fluid flow therethrough in accordance with the differences between the magnitudes of a first pressure, second pressure, third pressure, and fourth pressure, and comprising:

a housing having a bore; first, second, third, and fourth openings in said bore communicating with fluid at first, second, third, and fourth pressures respectively;

flow control means located in said bore comprising valving means for regulating fluid flow from said first opening to said second opening, said flow control means further comprising a piston slidably located in said bore, means for communicating said first and third pressures via their first and third openings to opposite sides of said piston thereby urging the piston in opposite directions;

a chamber formed by said flow control means and said bore, said fourth opening being in a wall of said chamber;

a regulating valve means for controlling fluid flow from said fourth opening through said chamber to said third opening thereby deriving a servo pressure in said chamber from said third and fourth pressures, said servo pressure functioning in part to control said valving means; said regulating valve means comprising an opening formed by cooperating surfaces on said valving means and said piston which by their relative positions determine the size of said opening.

2. A valve arrangement according to claim 1 in which said piston is slidable within said valving means.

3. A valve arrangement according to claim 1 which includes spring means in said bars for biasing said piston against said first pressure, and temperature responsive means for varying the bias applied by said spring.

4. A valve arrangement according to claim 2 which includes spring means in said bore for biasing said piston against said first pressure, and temperature responsive means for varying the bias applied by said spring.

* * * * *